J. M. KOZIOL.
HUSKING HOOK.
APPLICATION FILED DEC. 29, 1915.

1,179,843.

Patented Apr. 18, 1916.

Witness
C. Heppert

Inventor
J. M. Koziol.
By Edward Phelps
Attorney

UNITED STATES PATENT OFFICE.

JOSEPH M. KOZIOL, OF HERMAN, NEBRASKA.

HUSKING-HOOK.

1,179,843.  Specification of Letters Patent.  Patented Apr. 18, 1916.

Application filed December 29, 1915. Serial No. 69,148.

*To all whom it may concern:*

Be it known that I, JOSEPH M. KOZIOL, a Polish resident, citizen of the United States, residing at Herman, in the county of Washington and State of Nebraska, have invented certain new and useful Improvements in Husking-Hooks, of which the following is a specification.

This invention relates to corn husking implements, and more particularly to that class of such devices adapted to be worn on the hand to assist in cutting and stripping the husk during the husking operation.

The primary object of this invention is to so construct a device of the character set forth as to provide means for cutting the husk and means placed adjacent thereto adapted for stripping the husk from the ear and a further object thereof is the provision of a resilient pivoted mounting for the stripping hook, by means of which the hook is prevented from going too deep under the husk and injuring the ear of corn.

A still further object is the provision of removable cutting and stripping means which may be replaced when worn out.

With the foregoing and other objects in view as will from time to time appear the invention consists in the peculiar arrangement and combination of the various coöperating elements of a corn husking implement as hereinafter described and more particularly set forth in the appended claims.

Figure 1:
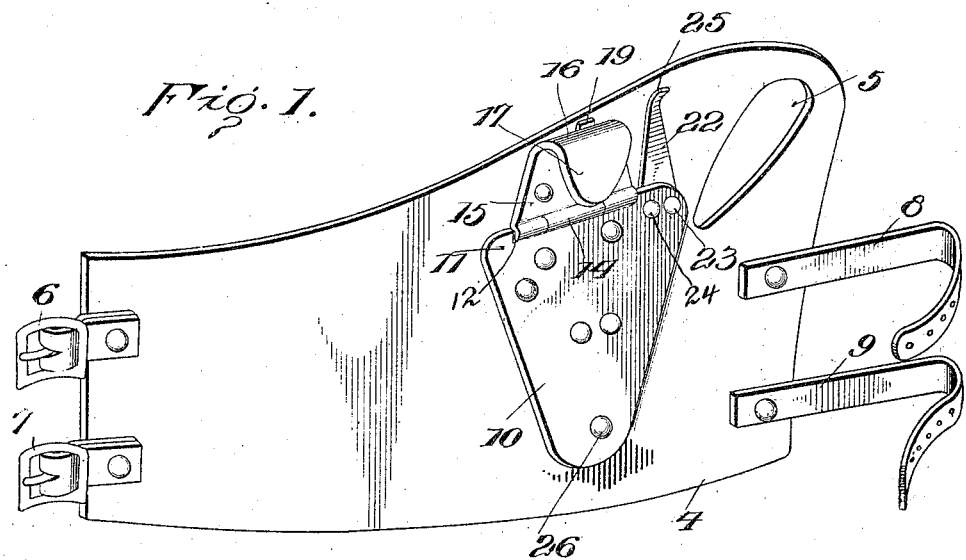
Figure 2:
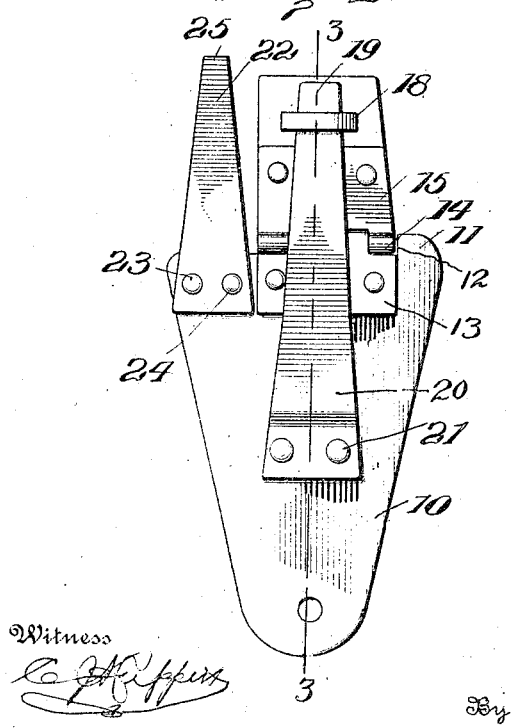
Figure 3:
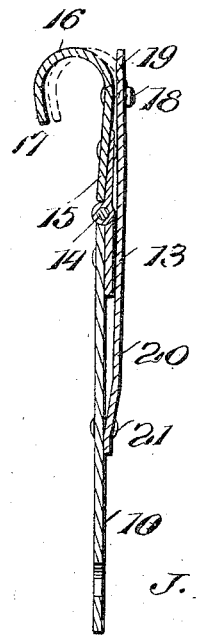

Referring to the accompanying drawing forming a portion of this specification and in which is illustrated the preferred embodiment thereof; the same reference characters indicating the same parts wherever used, Figure 1 is a perspective view of the device. Fig. 2 is a rear view of the cutting and stripping members and their support, and Fig. 3 is a section on line 3—3 of Fig. 2.

4 designates a flexible member of any suitable material shaped to fit the hand and provided with a thumb hole 5 and buckles 6—7 to receive straps 8—9 to hold the device in position upon the hand of the operator.

Secured to the flexible portion 4 in such a position as to rest in the palm of the hand is a metal member 10 formed at its upper end with a lug 11 and a cut out portion 12 adjacent to which is riveted one leaf 13 of a hinge, the pintle 14 thereof lying in the cut out portion 12 and the other leaf 15 extending upwardly and bent at 16 to form a stripping hook 17 having on the reverse side thereof a stirrup 18 engaged by the free end 19 of a leaf spring 20 riveted at 21—21 to the plate 10 in order that the stripping hook may be allowed a slight amount of movement upon the pintle 14, such movement however being governed by the spring 20. Adjacent the hook 17 is a knife blade 22 riveted at 23—24 to the plate 10 and provided with a hooked end 25 for splitting the husk. The plate 10 is suitably secured to the leather member 4 by rivets 26 or in any other desired manner.

The operation of the device is as follows: The device is placed upon the hand of the operator in such a manner as to bring the plate 10 in the palm thereof and the thumb into the opening 5 and the straps 8—9 adjusted. When in this position the knife 22 is brought into engagement with the corn husk to slit the same when it is engaged by the hook 17 and stipped from the ear. The resilient mounting of the stripping hook forms a cushion for the hook and allows it only to ride around the ear of corn and not to penetate the same, thus removing the husk and preventing injury to the kernels.

Without further description, the foregoing will so fully reveal the gist of this invention that others can by applying current knowledge readily adapt it for various applications without omitting certain features that, from the standpoint of the prior art, fairly constitute essential characteristics of the generic or specific aspects of this invention, and therefore such adaptations should and are intended to be comprehended within the meaning and range of equivalency of the following claims.

Having thus described my invention what I claim as new and desire to secure by Letters Patent is—

1. In a device of the character described, the combination with a member adapted to fit the hand, of a plate carried thereby, a knife on said plate, and a resilient pivoted hook mounted on the plate adjacent said knife.

2. In a device of the character described, the combination with a member adapted to fit the hand, of a plate carried thereby, a cutting member on said plate, a hook pivoted on said plate, and a spring secured to said plate and engaging said hook and controlling the movement of said hook.

3. In a device of the character described, the combination with a member adapted to fit the hand, of a plate carried thereby, a cutting member on said plate, a hinge on said plate, a hook on said hinge, a spring secured to said plate, a stirrup on said hook, said spring engaging the stirrup whereby to control the movement of the hinge.

4. In a device of the character described, the combination with a member adapted to fit the hand, of a plate carried thereby, a cutting member on said plate, a hinge on said plate, a hook on said hinge, a spring secured to said plate, and means on said hook for slidably engaging the free end of said spring.

5. In a device of the character described, the combination with a member adapted to fit the hand, of a plate carried thereby, a knife secured to said plate, a hinge, one leaf of which is secured to said plate, a hook on the second leaf of said hinge, a spring one end of which is secured to said plate, and a stirrup on said hook adapted to receive the free end of said spring.

6. In a device of the character described, the combination with a member adapted to fit the hand, of a plate carried thereby and having a cut out portion, a knife on said plate, a hinge, one leaf of which is secured to said plate, the pintle of said hinge lying in the cut out portion thereof, a hook on the companion leaf of said hinge, a spring on said plate and slidably engaging said hook to cushion the movement thereof upon the pintle.

In testimony whereof I affix my signature in presence of two witnesses.

JOSEPH M. KOZIOL.

Witnesses:
  E. C. BURDIC,
  E. M. BURDIC.